(12) United States Patent
Harada et al.

(10) Patent No.: US 11,616,228 B2
(45) Date of Patent: Mar. 28, 2023

(54) NON-AQUEOUS ELECTROLYTE SECONDARY CELL

(71) Applicant: Panasonic Intellectual Property Management Co., Ltd., Osaka (JP)

(72) Inventors: Tomohiro Harada, Osaka (JP); Hiroshi Minami, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 418 days.

(21) Appl. No.: 16/640,223

(22) PCT Filed: Oct. 10, 2018

(86) PCT No.: PCT/JP2018/037637
§ 371 (c)(1),
(2) Date: Feb. 19, 2020

(87) PCT Pub. No.: WO2019/087708
PCT Pub. Date: May 9, 2019

(65) Prior Publication Data
US 2020/0365891 A1    Nov. 19, 2020

(30) Foreign Application Priority Data
Oct. 30, 2017    (JP) .............................. JP2017-209822

(51) Int. Cl.
*H01M 4/485*    (2010.01)
*H01M 4/525*    (2010.01)
(Continued)

(52) U.S. Cl.
CPC .......... *H01M 4/525* (2013.01); *H01M 4/131* (2013.01); *H01M 4/134* (2013.01); *H01M 4/661* (2013.01);
(Continued)

(58) Field of Classification Search
CPC ....... H01M 2010/4292; H01M 10/446; H01M 4/525; H01M 4/131; H01M 4/382;
(Continued)

(56) References Cited

U.S. PATENT DOCUMENTS

2002/0150816 A1    10/2002   Sakai et al.
2015/0357679 A1*   12/2015   Sano ................... H01M 50/167
                                                                429/94

FOREIGN PATENT DOCUMENTS

| CN | 1348230 A | 5/2002 |
| JP | 7-243957 A | 9/1995 |
| JP | 11-185818 A | 7/1999 |
| JP | 2000/285959 | * 10/2000 ............ H01M 10/05 |

(Continued)

OTHER PUBLICATIONS

English translation of JP 2001/243957 (Year: 2001).*
(Continued)

*Primary Examiner* — Yoshitoshi Takeuchi
(74) *Attorney, Agent, or Firm* — WHDA, LLP (57) ABSTRACT

The non-aqueous electrolyte secondary cell according to the present invention comprises: an electrode body constituted by a positive electrode including a positive electrode active material comprising a lithium-containing transition metal oxide, a negative electrode including a negative electrode current collector onto which metallic lithium is deposited during charging, and a separator disposed between the positive electrode and the negative electrode; and a non-aqueous electrolyte. The molar ratio of the total lithium content of the positive electrode and the negative electrode to the transition metal content of the positive electrode is 1.1 or less. During discharging, the positive electrode capacitance α(mAh) of the positive electrode and the volume X (mm³) of a hollow constituted by a space formed in the center of the electrode body 14 satisfy the relationship $0.5 \leq X/\alpha \leq 4.0$.

2 Claims, 2 Drawing Sheets

(51) Int. Cl.
  *H01M 4/131* (2010.01)
  *H01M 4/134* (2010.01)
  *H01M 4/66* (2006.01)
  *H01M 10/0525* (2010.01)
  *H01M 10/0587* (2010.01)
  *H01M 50/107* (2021.01)
  *H01M 4/02* (2006.01)

(52) U.S. Cl.
  CPC ... *H01M 10/0525* (2013.01); *H01M 10/0587* (2013.01); *H01M 50/107* (2021.01); *H01M 2004/027* (2013.01); *H01M 2004/028* (2013.01)

(58) Field of Classification Search
  CPC .... H01M 4/134; H01M 4/1395; H01M 4/661; H01M 2300/0025; H01M 4/485; H01M 4/0445
  See application file for complete search history.

(56) References Cited

FOREIGN PATENT DOCUMENTS

| | | | | |
|---|---|---|---|---|
| JP | 2001/229980 | * | 8/2001 | ............. C01B 31/02 |
| JP | 2001/243957 | * | 9/2001 | ............ H01M 10/05 |
| JP | 2001-243957 A | | 9/2001 | |
| JP | 2001243957 | * | 9/2001 | ............ H01M 10/05 |
| JP | 2004/063410 | * | 2/2004 | ............ H01M 10/05 |
| JP | 2004-63410 A | | 2/2004 | |

OTHER PUBLICATIONS

English translation of JP 2000/285959 (Year: 2000).*
English translation of JP 2004/063410 (Year: 2004).*
English translation of JP 2001/229980 (Year: 2001).*
International Search Report dated Jan. 15, 2019, issued in counterpart International Application No. PCT/JP2018/037637. (1 page).
English Translation of Chinese Search Report dated Aug. 18, 2022 for the related Chinese Patent Application No. 201880053932.9.

* cited by examiner

NON-AQUEOUS ELECTROLYTE SECONDARY CELL

TECHNICAL FIELD

The present disclosure relates to a non-aqueous electrolyte secondary battery, and more specifically to a lithium secondary battery.

BACKGROUND ART

A further increase in capacity of non-aqueous electrolyte secondary batteries has been required also in the field of equipment for vehicles, the field of the accumulation of electricity, and the like in addition to the ICT field of apparatuses such as personal computers and smart phones. As non-aqueous electrolyte secondary batteries with high capacity, lithium ion batteries have been used exclusively. Although a configuration in which, for example, a lithium-containing transition metal oxide is used for a positive electrode, and a negative electrode active material comprising graphite, a silicon compound and the like is used for an negative electrode is blown as a lithium ion battery, this configuration is reaching the limit with respect to an increase in capacity.

Patent Literature 1 discloses a lithium battery in which a part of a positive electrode comprises a lithium transition metal oxide having an inverse spinel structure, and a negative electrode is selected from the group consisting of lithium metal, a lithium alloy and a lithium intercalation compound.

Patent Literature 2 discloses a rechargeable battery in which a part of a positive electrode comprises a specific lithium manganese oxide intercalation compound a negative electrode comprises a lithium manganese oxide intercalation compound, and an electrolyte comprises a lithium salt dissolved in a non-aqueous solvent.

CITATION LIST

Patent Literature

PATENT LITERATURE 1: Japanese Unexamined Patent Application Publication No. Hei7-243957

SUMMARY

In a battery system using a lithium-containing transition metal oxide for a positive electrode and also using lithium metal for a negative electrode like a technique disclosed in Patent Literature 1, the amount of lithium metal in the system increased, the amount of lithium metal based on the amount of the transition metal in the system was however surplus, and it could not, therefore, be said that the capacity improvement effect was enough. There is a lithium secondary battery in which lithium metal is deposited on a negative electrode at the time of charge, and the lithium metal is dissolved in a non-aqueous electrolyte at the time of discharge as a non-aqueous electrolyte secondary battery which is promising with respect to an increase in capacity. However, there was a problem that in such a lithium secondary battery, stress occurred in the electrode by the expansion of the negative electrode due to the deposition of lithium metal and ununiform deposition of lithium metal on the surface of the negative electrode, and an electrode ruptured after all by repeated occurrence of stress in the electrode in every charge and discharge cycle.

Then, a non-aqueous electrolyte secondary battery which enables suppressing the rupture of an electrode which can occur when a charge and discharge cycle is repeated while achieving the increase in capacity of the battery has been required.

A non-aqueous electrolyte secondary battery which is one aspect of the present disclosure comprises: an electrode assembly including a positive electrode including a positive electrode active material comprising a lithium-containing transition metal oxide, a negative electrode, including a negative electrode current collector, wherein lithium metal deposits on the negative electrode current collector at the time of charge, and a separator disposed between the positive electrode and the negative electrode; and a non-aqueous electrolyte, and is characterized in that a molar ratio of a total amount of lithium which the positive electrode and the negative electrode have to an amount of the transition metal included in the positive electrode is 1.1 or less, and a positive electrode capacity of the positive electrode, $\alpha$(mAh), and a volume of a space formed at a center of the electrode assembly, X (mm$^3$), satisfy $0.5 \leq X/\alpha \leq 4.0$ in a discharge state.

A non-aqueous electrolyte secondary battery which is another aspect of the disclosure comprises: an electrode assembly including a positive electrode including a positive electrode active material comprising a lithium-containing transition metal oxide, a negative electrode, including a negative electrode current collector, wherein lithium metal deposits on the negative electrode current collector at the time of charge, and a separator disposed between the positive electrode and the negative electrode; a non-aqueous electrolyte; and a case housing the electrode assembly and the non-aqueous electrolyte, and is characterized in that a molar ratio of a total amount of lithium which the positive electrode and the negative electrode have to an amount of the transition metal included in the positive electrode is 1.1 or less, and an inner diameter of the case, Y, and an inner diameter of the electrode assembly, Z, satisfy $0.4 \leq Z/Y \leq 0.8$ in a discharge state.

According to the present disclosure, a non-aqueous electrolyte secondary battery which enables suppressing the rupture of an electrode which can occur when a charge and discharge cycle is repeated while achieving the increase in capacity of the battery can be provided.

DESCRIPTION OF EMBODIMENTS

As mentioned above, the increase in capacity of a non-aqueous electrolyte secondary battery (lithium secondary battery) in which lithium metal deposits on an negative electrode at the time of charge, and the lithium metal dissolves in a non-aqueous electrolyte at the time of discharge can be expected, and the battery however has a problem that the electrode ruptures due to stress which occurs with the swelling, due to lithium metal which deposits on the negative electrode. The present inventors have examined earnestly to solve such a problem and consequently found that even though lithium metal deposits on the negative electrode at the time of charge, and stress occurs in the electrodes (the positive electrode and the negative electrode) by the depositing lithium metal; a space is formed at the axial center of the winding axis of the electrode assembly comprising the positive electrode, the negative electrode and the separator beforehand, and the rupture of the electrodes can be suppressed by releasing the stress to the space thereby.

Figure 1:
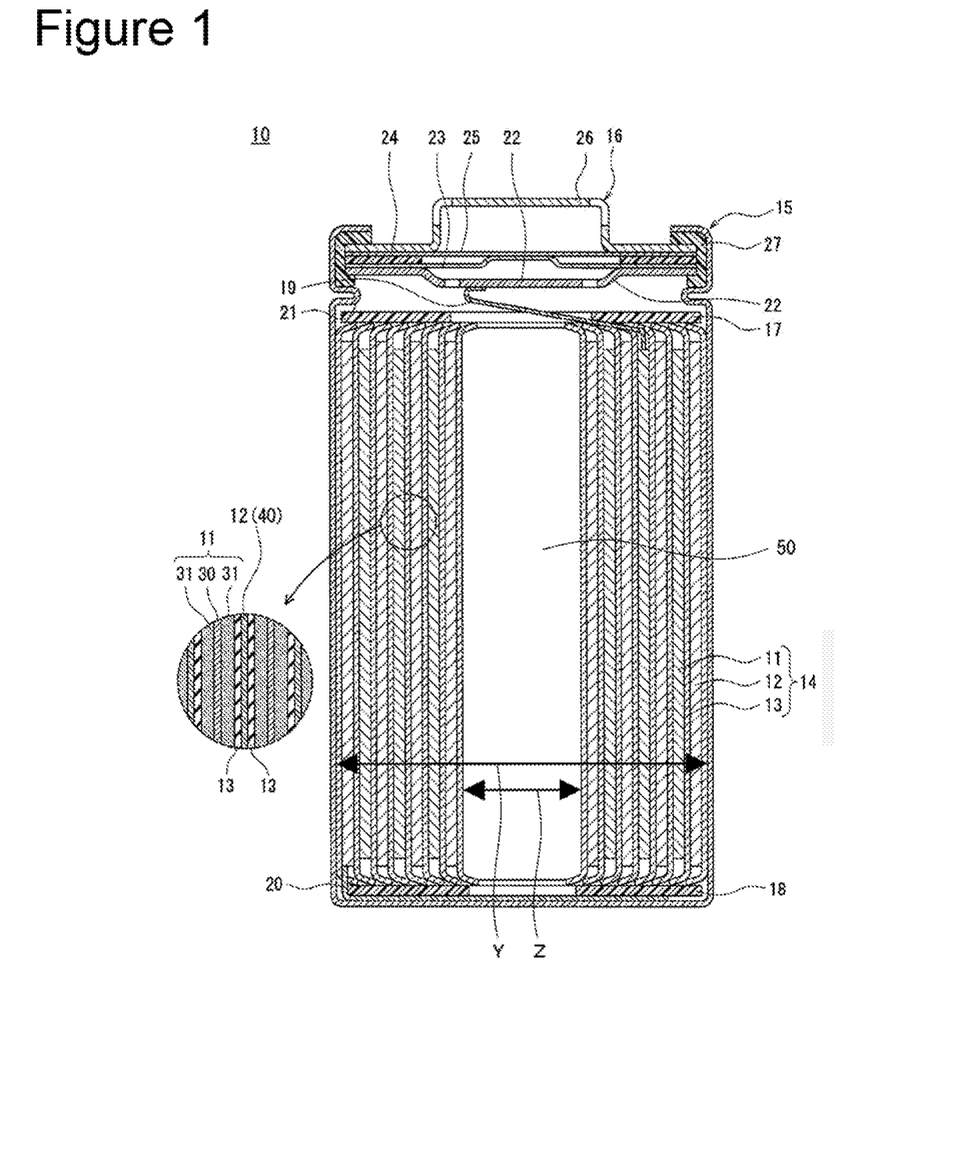
FIG. 1 is a longitudinal sectional view showing a non-aqueous electrolyte secondary battery which is an example of an embodiment.
Figure 2:
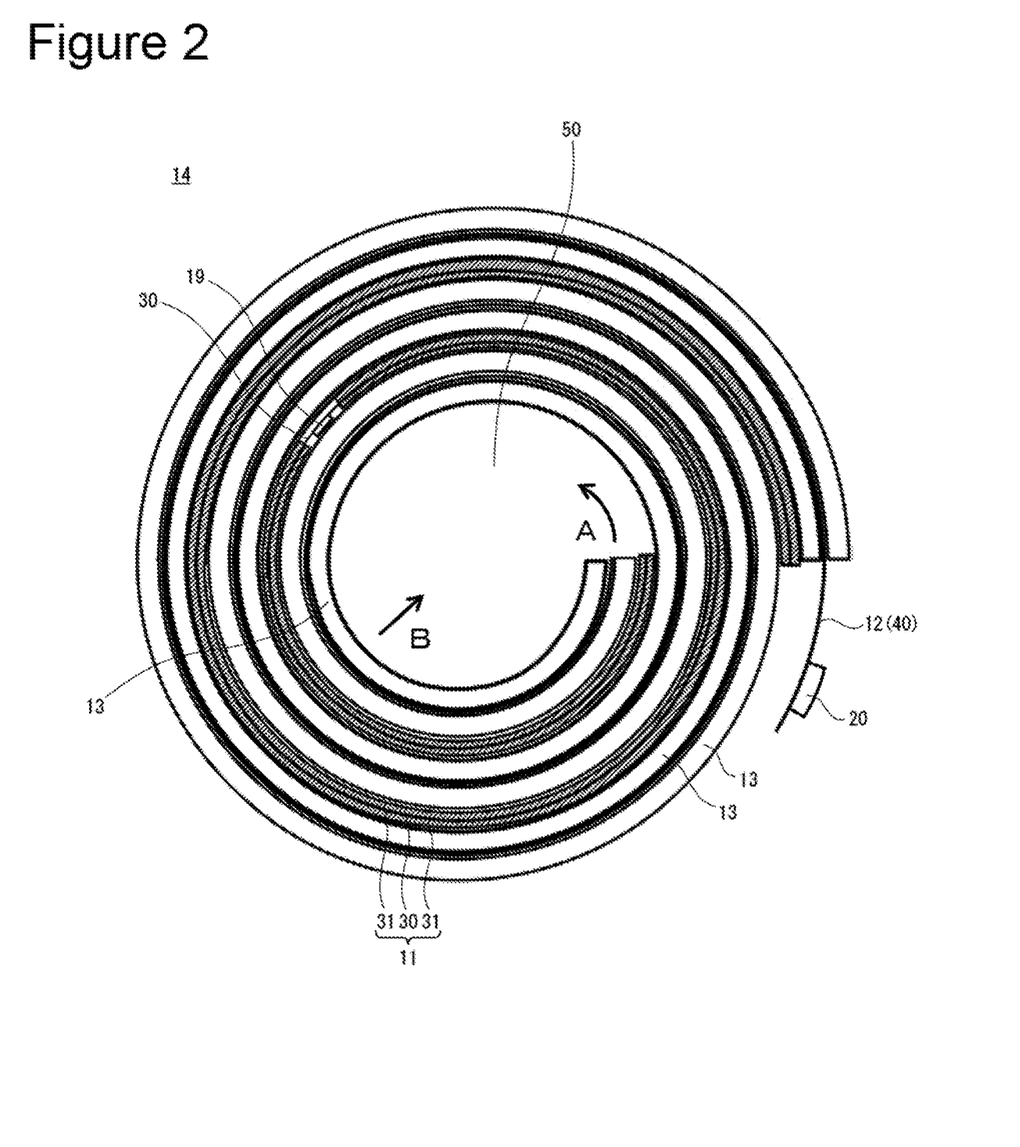
FIG. 2 is a partially transverse sectional view of an electrode assembly constituting a non-aqueous electrolyte secondary battery which is an example of an embodiment.

An example of an embodiment of a non-aqueous electrolyte secondary battery according to the present disclosure will be described in detail hereinafter. FIG. 1 is a longitudinal sectional view of a non-aqueous electrolyte secondary battery 10 which is an example of an embodiment, and shows a section including a direction along the winding axis of an electrode assembly 14. FIG. 2 is a transverse sectional view in a plane perpendicular to the winding axis of the electrode assembly 14 constituting the non-aqueous electrolyte secondary battery 10 which is an example of an embodiment, and schematically shows the disposition of a positive electrode 11, a negative electrode 12 and a separator 13 constituting the electrode assembly 14.

Although the non-aqueous electrolyte secondary battery 10 illustrated as an embodiment is a cylindrical battery comprising a cylindrical case made of metal, the non-aqueous electrolyte secondary battery of the present disclosure is not limited to this. The non-aqueous electrolyte secondary battery of the present disclosure may be, for example, a square battery comprising a square-shaped case made of metal, a laminated battery comprising an armor body comprising an alum aluminum laminate sheet, or the like.

As illustrated in FIG. 1, the non-aqueous electrolyte secondary battery 10 comprises the electrode assembly 14 having a winding structure and a non-aqueous electrolyte (not Shown). As shown in FIG. 1 and FIG. 2, the electrode assembly 14 comprises the positive electrode 11, the negative electrode 12 and the separator 13, and is formed by winding the positive electrode 11 and the negative electrode 12 through a separator 13 spirally. The non-aqueous electrolyte secondary battery 10 is a lithium secondary battery which lithium metal deposits on the negative electrode 12 at the time of charge, and the lithium metal dissolves in the non-aqueous electrolyte at the time of discharge.

All of the positive electrode 11, the negative electrode 12 and the separator 13 constituting the electrode assembly 14 are formed in the shapes of belts, wound spirally, and layered by turns in the diameter direction of the electrode assembly 14 thereby. In the electrode assembly 14, the longitudinal direction of each electrode is the winding direction, and the cross direction of each electrode is the direction of the axis. The space (hollow part 50) including the axial center of the winding axis and extending along the direction of the axis is formed in the electrode assembly 14. The hollow part 50 will be described in detail hereinafter.

A positive electrode lead 19 electrically connecting the positive electrode 11 and a positive electrode terminal is connected, for example, with the center in the longitudinal direction of the positive electrode 11, and extend from one end of the electrode assembly 14. A negative electrode lead 20 electrically connecting the negative electrode 12 and a negative electrode terminal is connected, for example, with an end in the longitudinal direction of the negative electrode 12, and extends from the other end of the electrode assembly 14. In the electrode assembly 14, when the negative electrode lead 20 connects with an end located outside in the diameter direction of the negative electrode 12, the negative electrode 12 lengthens in the winding direction at the time of the occurrence of stress in the negative electrode 12, and the range to which stress can be released is preferably widened.

In the example shown in FIG. 1, the battery case made of metal and housing the electrode assembly 14 and the non-aqueous electrolyte is constituted by a case body 15 and a sealing assembly 16. Insulating plates 17 and 18 are provided above and below the electrode assembly 14, respectively. The positive electrode lead 19 extends to the sealing assembly 16 side through a through hole of the insulating plate 17, and is welded to the lower surface of a filter 22 which is a bottom plate of the sealing assembly 16. In the non-aqueous electrolyte secondary battery 10, the cap 26 of the sealing assembly 16 electrically connected with the filter 22 functions as the positive electrode terminal. Meanwhile, the negative electrode lead 20 extends to the bottom side of the case body 15, and is welded to the inside of the bottom of the case body 15. In the non-aqueous electrolyte secondary battery 10, the case body 15 functions as the negative electrode terminal.

The case body 15 is a bottomed cylindrical container made of metal. A gasket 27 is provided between the case body 15 and the sealing assembly 16, and the sealability in the battery case is secured. The case body 15 has a projecting portion 21 which is formed, for example, by pressing a side portion from outside and supports the sealing assembly 16. The projecting portion 21 is preferably formed in a ring shape along the circumferential direction of the case body 15, and supports the sealing assembly 16 on its upper surface.

The sealing assembly 16 has a structure in which the filter 22, a lower vent member 23, an insulating member 24, an upper vent member 25 and the cap 26 are layered sequentially from the electrode assembly 14 side. Members constituting the sealing assembly 16 have, for example, disk shapes or ring shapes, and the members except the insulating member 24 are electrically connected with each other. The lower vent member 23 and the upper vent member 25 are connected with each other at the respective centers, and the insulating member 24 is between the respective peripheries. When the internal pressure of the battery increases by abnormal heat generation, the lower vent member 23 is provided with an air holes, and the upper vent member 25 therefore swells to the cap 26 side, and is separated from the lower vent member 23. The electrical connection between both is cut off thereby. When the internal pressure further increases, the upper vent member 25 ruptures and gas is discharged from an opening of the cap 26.

[Hollow Part]

The hollow part 50 which is a space including the axial center of the winding axis and extending along the direction of the axis is formed in the electrode assembly 14 according to the present disclosure. When a negative electrode 12 not including a negative electrode mixture layer on the negative electrode current collector 40 is used in the lithium secondary battery, lithium metal dissolving in the electrolytic solution deposits on the surface of the negative electrode 12 at the time of charge. The hollow part 50 formed in the non-aqueous electrolyte secondary battery 10 of the present disclosure enables suppressing the rupture of the electrodes resulting from this lithium depositing on the negative electrode 12. It is considered that the principle is as follows.

Such deposition of lithium occurs ununiformly on the surface of the negative electrode 12. Therefore, a local distortion occurs in the electrode assembly 14, and stress occurs especially in the positive electrode 11 and the negative electrode 12 (when the positive electrode 11 and the negative electrode 12 are not distinguished, both are generically named "electrodes" herein) including current collectors made of metal. As charge proceeds further, the amount of lithium deposited increases (swelling), stress which occurs in the electrodes is increased. Since the electrodes and the separator are densely layered in the case body for an increase in capacity in a battery not including a hollow part 50, stress which occurs in the electrodes is not released. Therefore, fatigue accumulates in the electrodes by stress which occurs every time a charge and discharge cycle is repeated, and the electrodes rupture after all.

Meanwhile, in the non-aqueous electrolyte secondary battery 10 of the present disclosure, the hollow part 50 which can allow the electrodes and the separator 13 to move is secured in the center of the electrode assembly 14. When stress occurs in the electrodes at the time of charge, the stress which occurs can therefore be released by lengthening the electrodes spirally along the winding direction (the direction of an arrow A in FIG. 2) or moving the electrodes and the like slightly inside in the layering direction (the direction of an arrow B in FIG. 2) in the case of the electrodes and the like near the axis center. Therefore, it is considered that even though a charge and discharge cycle is repeated, fatigue by the occurrence of stress is not accumulated in the electrodes, and the rupture of the electrodes resulting from the deposition of lithium can be suppressed consequently.

It can be said that the formation of the hollow part 50 in the lithium secondary battery is disadvantageous with respect to the improvement in the capacity of the battery. However, in the non-aqueous electrolyte secondary battery 10 of the present disclosure, a space in which the negative electrode mixture layer is not provided can be used for expanding the areas of the positive electrode 11 and the negative electrode 12 per battery and increasing the content of a lithium-containing transition metal oxide which is a positive electrode active material per battery as compared with a conventional lithium secondary battery in which negative electrode mixture layers are provided on both sides of the negative electrode current collector. Therefore, the positive electrode capacity per battery increases beyond a capacity decrease by forming the hollow part, and the increase in capacity of the battery can be achieved.

According to one aspect of the present disclosure, when the non-aqueous electrolyte secondary battery 10 is in a discharge state, the hollow part 50 is formed so that the positive electrode capacity of the positive electrode 11, α(mAh), and the volume of the hollow part 50, X (mm³), satisfy 0.5≤X/α≤4.0. The positive electrode capacity of the positive electrode 11, α at the time of the discharge of the non-aqueous electrolyte secondary battery 10 is calculated by the product of the theoretical capacity of lithium metal (3860 mAh/g) by the total mass of lithium included in the positive electrode 11, more specifically the positive electrode mixture layer 31. The total mass of lithium included in the positive electrode mixture layer 31 may be calculated, for example, based on the composition and the thickness of the positive electrode mixture layer 31, and the total area of the wound positive electrode mixture layer 31. Meanwhile, the volume of the hollow part 50 X is the volume of a space including the winding axis center a the electrode assembly 14, extending, in the direction of the axis, and surrounded by an end face in the direction of the axis of the electrode assembly 14 and the innermost layer in the electrode assembly 14 (the separator 13 in FIG. 1 and FIG. 2).

It can also be said that the ratio of the volume of the hollow part 50, X, to the positive electrode capacity of the positive electrode 11, α, expresses the relationship between the amount of lithium metal deposited on the negative electrode 12 at the time of charge and the space occupying the hollow part 50. When the ratio X/α is too low, a space to which the positive electrode 11 and the negative electrode 12 move to release stress which occurs by the deposition of lithium metal cannot be secured, and the effect of preventing electrode rupture is not obtained fully. When the ratio X/α is too high, the lithium content per battery decreases, and the effect of capacity improvement over a conventional battery manufactured using a negative electrode including a negative electrode mixture layer is lost. The positive electrode capacity of the positive electrode 11, α, and the volume of the hollow part 50, X, preferably satisfy 0.5≤X/α≤4.0, and more preferably satisfy 0.5≤X/α≤1.9 from the above-mentioned viewpoints.

According to another aspect of the present disclosure, when the non-aqueous electrolyte secondary battery 10 is in a discharge state, the hollow part 50 is formed so that the inner diameter of the case body 15 Y and the inner diameter of the electrode assembly 14 Z satisfy 0.4≤Z/Y≤0.8. Both the inner diameter of the case body 15 Y and the inner diameter of the electrode assembly 14 Z are average values in a cross-section perpendicular to the winding axis and average values along the direction of the winding axis at the same time. When the ratio Z/Y is too low, a space to which the positive electrode 11 and the negative electrode 12 move to release stress which occurs by the deposition of lithium metal cannot be secured, and the effect of preventing electrode rupture is not obtained fully. When the ratio Z/Y is too high, the ratio of the electrode assembly 14 to the ease body 15 decreases, the lithium content per battery decreases, and the effect of capacity improvement over a conventional battery manufactured using a negative electrode including a negative electrode mixture layer is lost. In the present aspect, the inner diameter of the case body 15 Y and the inner diameter of the electrode assembly 14 Z in a discharge state preferably satisfy 0.40≤Z/Y≤0.80, and more preferably satisfy 0.40≤Z/Y≤0.60 from the above-mentioned viewpoints.

The volume of the hollow part 50 X, the inner diameter of the case body 15 Y, and the inner diameter of the electrode assembly 14 Z in the non-aqueous electrolyte secondary battery 10 may be measured, for example, using an X-my CT apparatus (for example, "Microfocus X-Ray Fluoroscopy System SMX-2000" manufactured by SHIMADZU CORPORATION). The positive electrode capacity of the positive electrode 11, α, is calculated as the product of the total mass of lithium included in the positive electrode mixture layer 31 by the theoretical capacity of lithium metal (3860 mAh/g) as mentioned above. The total mass of lithium included in the positive electrode mixture layer 31 is calculated, for example, based on the composition, the thickness and the total area of the positive electrode mixture layer 31. Here, the thickness and the total area of the positive electrode mixture layer 31 may be measured using the above-mentioned X-ray CT apparatus. The composition of the lithium-containing transition metal oxide included in the positive electrode mixture layer 31 is subjected to qualitative and quantitative analyses using a well-known analysis apparatus such as an ICP emission spectrophotometer (for example, "CIROS-120" manufactured by Spectro Corporation). The volume of the hollow part 50 X, the inner diameter of the case body 15 Y, and the inner diameter of the electrode assembly 14 Z are values measured at the time of the initial stage of cycles, and are measured, for example, using a battery in 10 cycles or less.

In the non-aqueous electrolyte secondary battery 10 of the present disclosure, the molar ratio of the total amount of lithium which the positive electrode 11 and the negative electrode 12 have to the amount of the transition metal included in the positive electrode 11 is 1.1 or less. When lithium and the transition metal included in the non-aqueous electrolyte secondary battery 10 are in the above-mentioned range, distortion caused in the positive electrode structure by excessively intercalating lithium into the positive electrode active material at the time of discharge in the positive electrode active material can be prevented, and an increase in resistance can be controlled. The total amount (the total content) of lithium which the positive electrode 11 and the negative electrode 12 have is the total amount of lithium constituting the lithium-containing transition metal oxide included in the positive electrode mixture layer 31 of the positive electrode 11 as the positive electrode active material and lithium when the negative electrode current collector 40 of the negative electrode 12 has the lithium metal in the non-aqueous electrolyte secondary battery 10.

Components of the electrode assembly 14 (the positive electrode 11, the negative electrode 12 and the separator 13) and the non-aqueous electrolyte will be described in detail hereinafter.

[Positive Electrode]

The positive electrode 11 comprises the positive electrode current collector 30 and the positive electrode mixture layer 31 formed on the current collector. Foil of a metal such as aluminum which is stable in the potential range of the positive electrode 11, a film wherein the metal is disposed on the outer layer, or the like can be used for the positive electrode current collector 30. The positive electrode mixture layer 31 comprises the positive electrode active material, a conductive agent and a binding agent. Positive electrode mixture layers 31 are generally formed on both surfaces of the positive electrode current collector 30. The positive electrode 11 can be manufactured, for example by applying positive electrode mixture slurry including the positive electrode active material, the conductive agent, the binding agent and the like to the positive electrode current collector 30, drying the coating films, and then rolling the coating films to form positive electrode mixture layers 31 on both surfaces of the current collector, The positive electrode active material included in the positive electrode mixture layer 31 comprises a lithium-containing transition metal oxide. A metallic element other than lithium constituting a lithium-containing transition metal oxide is, for example, at least one selected from magnesium (Mg), aluminum (Al), calcium (Ca), scandium (Sc) titanium (Ti), vanadium (V), chromium (Cr), manganese (Mn), iron (Fe), cobalt (Co), nickel (Ni) copper (Cu), zinc (Zn), gallium (Ga), germanium (Ge), yttrium (Y), zirconium (Zr), tin (Sn), antimony (Sb), tungsten (W), lead (Pb) and bismuth (Bi). In the present disclosure, these metallic elements other than lithium constituting the lithium-containing transition metal oxide are considered as "transition metals constituting the lithium-containing transition metal" for convenience. The lithium-containing transition metal oxide included in the positive electrode mixture layer 31 preferably includes at least one selected from Co, Ni, Mn, and Al as the transition metals. The molar ratio of lithium to the transition metal constituting the lithium-containing transition metal is 1.1:1 or less.

Examples of the conductive agent constituting the positive electrode mixture layer 31 include carbon materials such as carbon black (CB), acetylene black (AB), ketjen black and graphite. Examples of the binding agent constituting the positive electrode mixture layer 31 include fluorine-containing resins such as polytetrafluoroethylene (PTFE) and poly vinylidene fluoride (PVDF), polyacrylonitrile (PAN); polyimide-based resins; acrylic-based resins and polyolefin-based resin. These may be used alone or in combination of two or more.

The lithium-containing transition metal oxide included in the positive electrode mixture layer 31 preferably has a crystal structure belonging to the space group R-3m. The crystal structure belonging to the space group R-3m is a structure formed by layering lithium-oxygen octahedral layers and transition metal-oxygen octahedral layers, and is a crystal structure which, for example, lithium nickelate ($LiNiO_2$) and lithium cobaltate ($LiCoO_2$) have. It is because when the positive electrode active material has a crystal structure belonging to the space group R-3m, a high charge and discharge capacity is obtained in the secondary battery. It can be confirmed that the positive electrode active material has a crystal structure belonging to the space group R-3m, for example, by performing analysis based on a powder X-ray diffractometry as to the positive electrode active material and obtaining an X-ray diffraction pattern.

[Negative Electrode]

The negative electrode 12 is an electrode on which lithium metal is deposited at the time of charge, and has the negative electrode current collector 40. Lithium metal which deposits on the negative electrode 12 by charge is derived from lithium ions in the non-aqueous electrolyte, and the depositing lithium metal dissolves in the electrolytic solution by discharge.

The negative electrode current collector 40 comprises metallic foil such as copper, nickel, iron and stainless alloy (SUS), and copper foil with high conductivity is particularly preferable. The copper foil is metallic foil including copper as the main component, and may comprise only copper substantially. The thickness of the copper foil is preferably 5 mm or more and 20 mm or less. The negative electrode 12 comprises only copper foil having a thickness of 5 mm or more and 20 mm or less, for example, before the charge and discharge of the battery. Lithium metal deposits on both surfaces of the copper foil by charge to form lithium metal layers. The negative electrode current collector 40 may contain a lithium metal layer. For example, the lithium metal layer may be lithium metal foil, or may be an article wherein a lithium metal layer is formed on the surface by vapor deposition or the like (in this case, the lithium functions as an active material). The negative electrode current collector 40 does not preferably have a negative electrode active material in the initial state.

The negative electrode 12 preferably comprises only the negative electrode current collector 40 in the initial state. The volume energy density of the battery can be increased thereby. When a current collector or the like including lithium metal foil or a lithium metal layer is used as the negative electrode current collector 40, the volume energy density of the battery decreases by the thickness of the lithium layer.

The negative electrode current collector 40 may have a layer including a solid electrolyte, organic matter and inorganic matter (protective layer) on the surface. The protective layer has the effect of uniforming an electrode surface reaction, lithium metal uniformly deposits on the negative electrode, and the swelling of the negative electrode 12 can be suppressed. Examples of a solid electrolyte include sulfide-based solid electrolytes, phosphate-based solid electrolytes, perovskite-based solid electrolytes and garnet-based solid electrolytes.

As long as the above-mentioned sulfide-based solid electrolytes contain a sulfur component and have lithium ion conductivity, the sulfide-based solid electrolytes are not particularly limited, Specific examples of raw materials of the sulfide-based solid electrolytes include a raw material including Li, S and the third component A. Examples of the third component A include at least one selected from the group consisting of P, Ge, B, Si, I, Al, Ga and As. Specific examples of the sulfide-based solid electrolytes include $Li_2S$—$P_2S_5$, $70Li_2S$-$30P_2S_5$, $80Li_2S$-$20P_2S_5$, $Li_2S$—$SiS_2$ and $LiGe_{0.25}P_{0.75}S_4$.

As long as the above-mentioned phosphate-based solid electrolytes contain a phosphate component and have lithium ion conductivity, the phosphate-based solid electrolytes are not particularly limited. Examples of the phosphate-based solid electrolytes include $Li_{1+X}Al_XTi_{2-X}(PO_4)_3$ (0<X<2, particularly preferably 0<X≤1), such as $Li_{1.5}Al_{0.5}Ti_{1.5}(PO_4)_3$; and $Li_{1+X}Al_XGe_{2-X}(PO_4)_3$ (0<X<2, particularly preferably 0<X≤1).

As the above-mentioned organic matter layer, lithium conductive substances such as polyethylene oxide and polymethyl methacrylate are preferable. As the inorganic matter layer, ceramic materials such as $SiO_2$, $Al_2O_3$ and MgO are preferable.

[Separator]

A porous sheet including ion permeability and insulation properties is used for the separator 13. Examples of the porous sheet include fine porous thin films, woven fabrics and nonwoven fabrics. As the material of the separator 13, olefin-based resins such as polyethylene, polypropylene and a copolymer including at least either of ethylene and propylene; cellulose; and the like are preferable. The separator 13 may be a layered body including a cellulose fiber layer and a thermoplastic resin fiber layer such as an olefin-based resin. The separator 13 may be a multilayer separator including a polyethylene layer and a polypropylene layer, and the separator 13 wherein an aramid-based resin or the like were applied to the surface of the separator 13 may be used. A heat-resistant layer including a filler of an inorganic compound may be formed on the interface between the separator 13 and at least either of the positive electrode 11 and the negative electrode 12.

[Non-Aqueous Electrolyte]

The non-aqueous electrolyte includes a non-aqueous solvent and an electrolyte salt dissolving in the non-aqueous solvent. For example, esters; ethers; nitrites such as acetonitrile; amides such as dimethylformamide; mixed solvents of two or more of these; and the like can be used for the non-aqueous sol vent. The non-aqueous solvent may contain halogen substitution products in which at least some of the hydrogen atoms of these solvents are replaced with halogen atoms such as fluorine atoms. The non-aqueous electrolyte is not limited to a liquid electrolyte (non-aqueous electrolytic solution), and may be a solid electrolyte using a gel polymer or the like.

Examples of the above-mentioned esters include cyclic carbonic esters such as ethylene carbonate (EC), propylene carbonate (PC), butylene carbonate and fluoroethylene carbonate (FEC); chain-like carbonic esters such as dimethyl carbonate (DMC), ethyl methyl carbonate (EMC), diethyl carbonate (DEC), methyl propyl carbonate, ethyl propyl carbonate and methyl isopropyl carbonate; cyclic carboxylate esters such as γ-butyrolactone and γ-valerolactone; and chain-like carboxylate esters such as methyl acetate, ethyl acetate, propyl acetate, methyl propionate (MP), ethyl propionate, γ-butyrolactone and fluoromethyl propionate (FMP).

Examples of the above-mentioned ether include cyclic ethers such as 1,3-dioxolane, 4-methyl-1,3-dioxolane, tetrahydrofuran, 2-methyltetrahydrofuran, propylene oxide, 1,2-butylene oxide, 1,3-dioxane, 1,4-dioxane, 1,3,5-trioxane, furan, 2-methylfuran, 1,8-cineol and crown ethers; and chain-like ethers such as 1,2-dimethoxyethane, diethyl ether, dipropyl ether, diisopropyl ether, dibutyl ether, dihexyl ether, ethyl vinyl ether, butyl vinyl ether, methyl phenyl ether, ethyl phenyl ether, butyl phenyl ether, pentyl phenyl ether, methoxytoluene, benzyl ethyl ether, diphenyl ether, dibenzyl ether, o-dimethoxybenzene, 1,2-diethoxyethane, 1,2-dibutoxyethane, diethylene glycol dimethyl ether, diethylene glycol diethyl ether, diethylene glycol dibutyl ether, 1,1-dimethoxymethane, 1,1-diethoxyethane, triethylene glycol dimethyl ether, and tetraethylene glycol dimethyl ether.

Examples of the electrolyte salt included in the non-aqueous electrolyte include $LiBF_4$, $LiClO_4$, $LiPF_6$, $LiAsF_6$, $LiSbF_6$, $LiAlCl_4$, $LiSCN$, $LiCF_3SO_3$, $LiCF_3CO_2$, and imide salts such as $LiN(SO_2CF_3)_2$, $LiN(C_lF_{2l+1}SO_2)(C_mF_{2m+1}SO_2)$ {l and m are integers of 1 or more}. $LiPF_6$ is preferably used particularly.

The non-aqueous electrolyte preferably includes an additive decomposed on the negative electrode 12. The non-aqueous electrolyte includes at least one selected, for example from vinylene carbonate (VC) fluoroethylene carbonate (FEC) and vinyl ethyl carbonate (VEC). The swelling of a negative electrode is further suppressed by adding VC and the like, and the cycle characteristics become better.

EXAMPLES

Although the present disclosure will be further described in detail hereinafter by the Examples, the present disclosure is not limited to these Examples.

Example 1

[Manufacturing of Positive Electrode]

A lithium-containing transition metal oxide containing aluminum, nickel and cobalt as a positive electrode active material; acetylene black (AB) and polyvinylidene fluoride (PVDF) were mixed at a mass ratio of 95:2.5:2.5, a suitable amount of N-methyl-2-pyrrolidone (NMP) was further added, and the mixture was stirred to prepare positive electrode mixture slurry. Next, the positive electrode mixture slurry was applied to both surfaces of a positive electrode current collector comprising aluminum foil, and the coating films were dried. The coating films were rolled using a roller, and the electrode was then cut to a predetermined electrode size to manufacture a positive electrode in which the positive electrode mixture layers were formed on both sides of the positive electrode current collector sequentially. The molar ratio of lithium to the total of the transition metals in the lithium-containing transition metal oxide used as the positive electrode active material was 1.0.

[Manufacturing of Negative Electrode]

Electrolytic copper foil (10 μm in thickness) was cut to a predetermined electrode size to form a negative electrode (negative electrode current collector). The copper foil was not coated with a negative electrode mixture.

[Preparation of Non-Aqueous Electrolytic Solution]

Ethylene carbonate (EC) and dimethyl carbonate (DMC) were mixed at a volume ratio of 3:7. $LiPF_6$ was dissolved in the mixed solvent at a concentration of 1.0 M (mol/L), and $LiBF_2(C_2O_4)$ was dissolved in the mixed solvent at a concentration of 0.1 M (mol/L) to prepare a non-aqueous electrolytic Solution.

[Manufacturing of Battery]

In an inert gas atmosphere, the above-mentioned positive electrode to which a tab made of aluminum was attached and the above-mentioned negative electrode to which a tab made of nickel was attached were wound spirally through a separator made of polyethylene to manufacture an electrode assembly. A space including the axis center of the winding axis and extending in the direction of the winding axis was formed in the electrode assembly of Example 1. The electrode assembly was housed in an armor body comprising an aluminum laminate (average inner diameter Y=20.0 mm). The above-mentioned non-aqueous electrolytic solution was injected, and the opening of the armor body was then sealed to manufacture a cylindrical battery T1 having a hollow part with a volume of 5000 mm$^3$ and a positive electrode capacity α of 7500 mAh. The molar ratio of the total amount of lithium included in the battery T1 to the amount of the transition metals included in the positive electrode was 1.0.

Example 2

A cylindrical battery T2 having a hollow part with a volume of 7250 mm$^3$ and a positive electrode capacity α of 3900 mAh was manufactured in the same way as in Example 1 except that the volume of the hollow part was changed using a belt-shaped positive electrode, a belt-shaped negative electrode and a belt-shaped separator which were different in length in the longitudinal direction (the winding direction) in the manufacturing of the battery.

Comparative Example 1 and Comparative Example 2

Cylindrical batteries T3 and T4 having hollow parts were manufactured in the same way as in Example 1 except that the volumes of the hollow parts were changed using belt-shaped positive electrodes, belt-shaped negative electrodes and belt-shaped separators which are different in length in the longitudinal direction (the winding direction) in the manufacturing of the batteries in the same way. The volume of the hollow part of the battery T3 was 800 mm$^3$, and the positive electrode capacity α was 7500 mAh. The volume of the hollow part of the battery T4 was 15000 mm$^3$, and the positive electrode capacity α was 3400 mAh.

Reference Example

A battery for reference was manufactured for comparing discharge capacities. The battery for reference comprises a negative electrode including negative electrode mixture layers on both sides of copper foil. Negative electrode mixture slurry containing graphite as an negative electrode active material and a binding agent (styrene-butadiene rubber) at a mass ratio of 97.5:2.5 was applied to both sides of the copper foil which is an negative electrode current collector, the coating films were dried, and the coating films were then rolled with a rolling roller to prepare the negative electrode. The battery T5 for reference having a positive electrode capacity α of 3400 mAh was manufactured in the same way as in Example 1 except that the negative electrode including the negative electrode mixture layers obtained by the above-mentioned method was used as an negative electrode, and the lengths of a belt-shaped positive electrode, belt-shaped negative electrode and belt-shaped separator were adjusted so that almost no space was formed at the center.

[Evaluation Test]

A charge and discharge cycle test was performed as to each of the batteries of the Examples and the Comparative Examples. Under a battery temperature condition of 25° C., the battery was subjected to constant current charge at a current of 0.1 It until the voltage value was 4.3 V, and the battery was then subjected to constant voltage charge at a constant voltage of 4.3V until the current value was 0.01 It using each battery. Then, the battery was subjected to constant current discharge at a current of 0.1 It until the voltage value was 2.5V, and the discharge capacity when the battery was subjected to this constant current discharge was defined as the initial discharge capacity of each battery.

As to each battery, a charge and discharge cycle comprising constant current charge to 4.3 V at a current of 0.1 It, an idle period of 15 minutes, constant current discharge to 2.5 V at a current of 0.1 It, and an idle period of 15 minutes was next repeated 5 times under a temperature condition of 60° C. Then, each battery was taken out when the voltage value was 3.5 V or more and 3.6 V or less in the discharge state. As to each battery taken out, the volume of the hollow part X, the inner diameter of the case, Y, and the inner diameter of the electrode assembly, Z, were measured, and it was observed whether the electrodes ruptured using an X-ray CT apparatus (for example, "Microfocus X-Ray Fluoroscopy System SMX-2000" manufactured by SHIMADZU CORPORATION), "Volume of hollow part X (mm$^3$)/positive electrode capacity α(mAh)" and "outer diameter of hollow part Z (mm)/inner diameter of case Y (mm)" were calculated from the obtained measurement results. Here, the positive electrode capacity α is a theoretical value calculated as to each battery based on the theoretical capacity of Li metal (3860 mAh/g), the composition and the layer thickness of the positive electrode mixture layer, and the area in which the positive electrode mixture layer was formed. Table 1 shows the calculation results.

Then, a charge and discharge cycle test in which the above-mentioned charge and discharge cycle was repeated 1500 times was performed to evaluate the electrode rupture suppressing performance of each battery. When 1500 charge and discharge cycles were completed at the voltage value and current value which were prescribed above as to each battery, it was determined that an electrode was not ruptured, and the electrode rupture suppressing performance of the battery was rated as "good". Meanwhile, when the prescribed voltage value or current value was not obtained in the charge and discharge cycle test while 1500 charge and discharge cycles were performed, it was determined that an electrode ruptured, and the electrode rupture suppressing performance of the battery was rated as "poor". When it was confirmed by observing a section of the electrode assembly as to each battery using the above-mentioned X-ray CT apparatus whether an electrode ruptured, the rupture of electrodes was not observed in batteries wherein the electrode rupture suppressing performance was rated as "good", and the rapture of electrodes was observed in batteries wherein the electrode rupture suppressing performance was rated as "poor". Table 1 shows the evaluation results.

The discharge capacity of each of the batteries of the Examples and the Comparative Examples was evaluated by comparing with the discharge capacity of the battery for reference. The battery for reference is a conventional non-aqueous electrolyte secondary battery wherein the battery comprises a negative electrode including negative electrode mixture layers on both surfaces, and almost no space is formed at the center of an electrode assembly. As to each battery, a battery having the discharge capacity of the battery for reference or less was rated as "poor", and a battery having more discharge capacity than the battery for reference was rated as "good" based on the theoretical capacity of Li metal of each battery (3860 mAh/g), the composition and the layer thickness of a positive electrode mixture layer, and the value of the discharge capacity calculated based on an area in which positive electrode mixture layers were formed. The value of the initial discharge capacity measured by the above-mentioned test exactly agreed with the calculated value of the discharge capacity as to each battery. Table 1 shows the evaluation results of the discharge capacity of each of the batteries of the Examples and the Comparative Examples.

TABLE 1

| | Volume of hollow part X/positive electrode capacity α (mm³/mAh) | Inner diameter of electrode assembly Z/inner diameter of case Y | Evaluation of electrode rupture | Evaluation of discharge capacity |
|---|---|---|---|---|
| Example 1 | 0.67 | 0.49 | Good | Good |
| Example 2 | 1.85 | 0.59 | Good | Good |
| Comparative Example 1 | 0.11 | 0.20 | Poor | The evaluation is impossible due to the rupture |
| Comparative Example 2 | 4.42 | 0.83 | Good | Poor |

As shown in Table 1, it was confirmed that in the battery of Comparative Example 1, electrodes ruptured after the charge and discharge cycle test; in the battery of Comparative Example 2, an increase in capacity could not be achieved; and meanwhile, in any of the batteries of the Examples, the electrodes did not rupture after the charge and discharge cycle test, and an increase in capacity over the conventional battery wherein the negative electrode mixture layers were provided on the negative electrode current collector was achieved. That is, it is considered that even though stress accompanying the deposition of the lithium metal on the negative electrode 12 at the time of charge occurred in the electrodes, the stress could be released by providing the space (hollow part 50) at the center of the electrode assembly 14 comprising the positive electrode 11, the negative electrode 12 and the separator 13 in the lithium deposition lithium secondary battery in which the negative electrode mixture layer was not provided on the negative electrode current collector 40, and the rupture of the electrodes was consequently suppressed. It is considered that although the electrode assembly 14 did not exist in the hollow part 50, the negative electrode 12 did not have the negative electrode mixture layer in the present embodiment, and the energy density per battery therefore improved and the increase in capacity of the battery was achieved.

REFERENCE SIGNS LIST

10 non-aqueous electrolyte secondary battery
11 positive electrode.
12 negative electrode
13 separator
14 electrode assembly
15 case body (battery case)
16 sealing assembly
17,18 insulating plates
19 positive electrode lead
20 negative electrode lead
21 projecting portion
22 filter
23 lower vent member
24 insulating member
25 upper vent member
26 cap
27 gasket
30 positive electrode current collector
31 positive electrode mixture layer
40 negative electrode current collector
50 hollow part (space).

The invention claimed is:

1. A non-aqueous electrolyte secondary battery, comprising:
a spiral-wound electrode assembly including:
a positive electrode including a positive electrode active material comprising a lithium-containing transition metal oxide,
a negative electrode, including a negative electrode current collector, wherein lithium metal deposits on the negative electrode current collector at the time of charge, and
a separator disposed between the positive electrode and the negative electrode; and
a non-aqueous electrolyte, wherein
a molar ratio of a total amount of lithium which the positive electrode and the negative electrode have to an amount of the transition metal included in the positive electrode is 1.1 or less, and
a positive electrode capacity of the positive electrode, α(mAh), and a volume of a space formed at a center of the spiral-wound electrode assembly, X (mm³), satisfy $0.5 \leq X/\alpha \leq 4.0$ in a discharge state, and
a case housing the spiral-wound electrode assembly and the non-aqueous electrolyte,
wherein an inner diameter of the case, Y (mm), and an inner diameter of the electrode assembly, Z (mm), satisfy $0.4 \leq Z/Y \leq 0.8$ in a discharge state.

2. The non-aqueous electrolyte secondary battery according to claim 1, wherein
the negative electrode current collector is copper foil.

* * * * *